US011444803B2

(12) United States Patent
Hirano et al.

(10) Patent No.: US 11,444,803 B2
(45) Date of Patent: Sep. 13, 2022

(54) IN-VEHICLE NETWORK SYSTEM

(71) Applicants: TOYOTA JIDOSHA KABUSHIKI KAISHA, Toyota (JP); MAZDA MOTOR CORPORATION, Hiroshima (JP)

(72) Inventors: Takahiro Hirano, Toyota (JP); Tetsuhiro Yamashita, Aki-gun (JP); Yoshimasa Kurokawa, Aki-gun (JP)

(73) Assignees: TOYOTA JIDOSHA KABUSHIKI KAISHA, Toyota (JP); MAZDA MOTOR CORPORATION, Aki-gun (JP)

( * ) Notice: Subject to any disclaimer, the term of this patent is extended or adjusted under 35 U.S.C. 154(b) by 149 days.

(21) Appl. No.: 17/001,800

(22) Filed: Aug. 25, 2020

(65) Prior Publication Data

US 2021/0068199 A1 Mar. 4, 2021

(30) Foreign Application Priority Data

Aug. 30, 2019 (JP) ............................ JP2019-157921

(51) Int. Cl.
*H04L 12/40* (2006.01)
*H04W 40/28* (2009.01)
*H04W 40/30* (2009.01)

(52) U.S. Cl.
CPC ....... *H04L 12/40189* (2013.01); *H04W 40/28* (2013.01); *H04W 40/30* (2013.01); *H04L 2012/40273* (2013.01)

(58) Field of Classification Search
None
See application file for complete search history.

(56) References Cited

U.S. PATENT DOCUMENTS

| | | | | |
|---|---|---|---|---|
| 10,331,128 | B1 * | 6/2019 | Hansel | H04L 9/3263 |
| 2003/0042792 | A1 * | 3/2003 | Reinold | H04L 45/00 307/9.1 |
| 2015/0281022 | A1 | 10/2015 | Harata et al. | |
| 2018/0229738 | A1 * | 8/2018 | Nilsson | B60W 40/105 |
| 2019/0097932 | A1 | 3/2019 | Buczek et al. | |
| 2019/0263425 | A1 | 8/2019 | Kanoh et al. | |
| 2019/0359221 | A1 | 11/2019 | Ochida et al. | |

FOREIGN PATENT DOCUMENTS

| | | | |
|---|---|---|---|
| EP | 3 587 194 | A2 | 1/2020 |
| JP | 2014-078800 | A | 5/2014 |
| WO | 2018/154860 | A1 | 8/2018 |

* cited by examiner

*Primary Examiner* — Brian S Roberts
(74) *Attorney, Agent, or Firm* — Oliff PLC

(57) ABSTRACT

An in-vehicle network system includes: an upper device; a first intermediate device that is connected to the upper device directly or via at least one device and is configured to communicate with the upper device using a first communication system; a second intermediate device that is connected to the upper device directly or via at least one device and is configured to communicate with the upper device using a second communication system; and a first lower device that is directly connected to the first intermediate device and is configured to communicate with the first intermediate device using the first communication system, and that is directly connected to the second intermediate device and is configured to communicate with the second intermediate device using the second communication system.

9 Claims, 2 Drawing Sheets

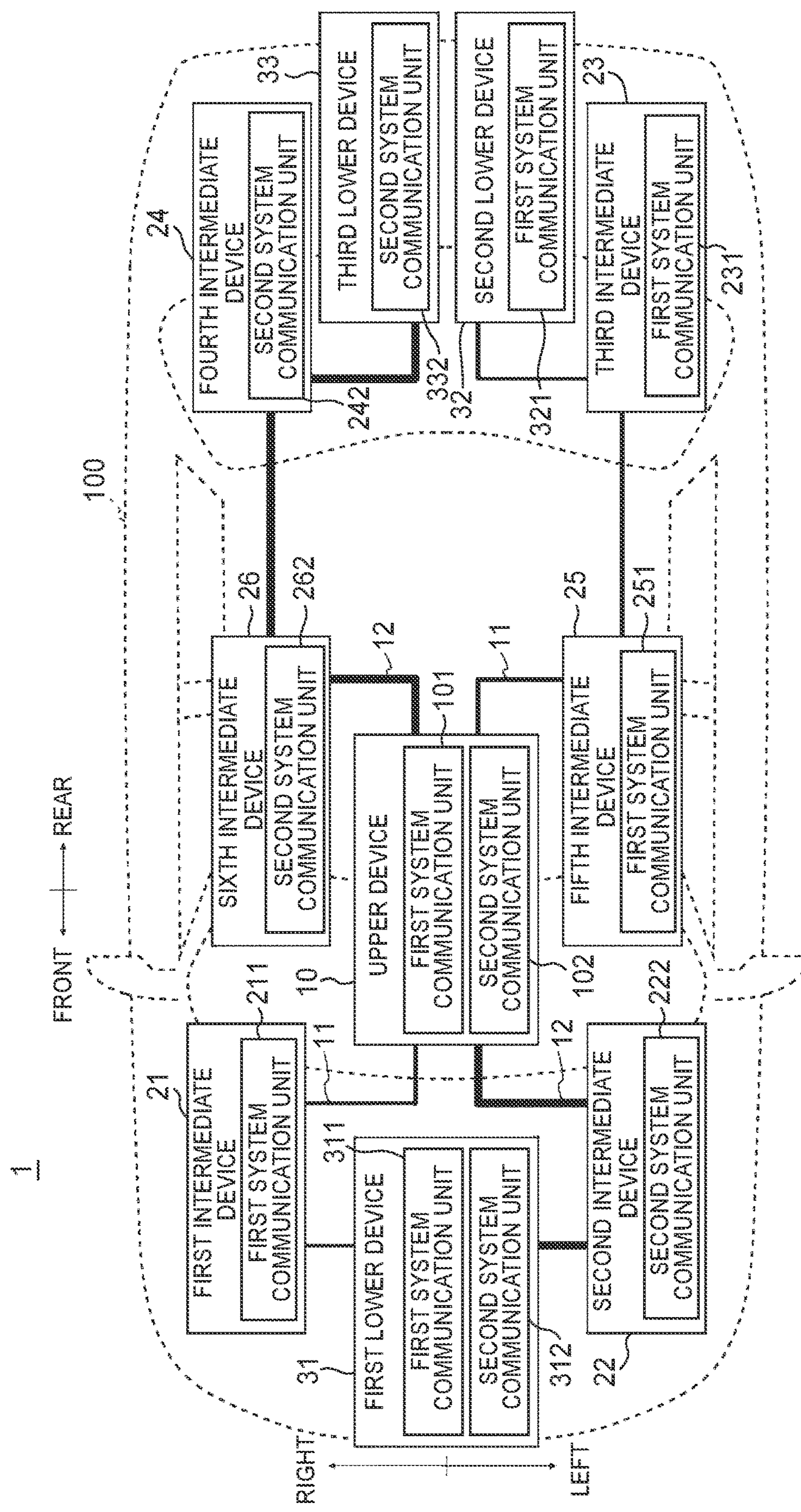

FIG. 1
1
FRONT
REAR
RIGHT
LEFT
100
UPPER DEVICE
FIRST SYSTEM COMMUNICATION UNIT
SECOND SYSTEM COMMUNICATION UNIT
10
101
102
11
12
FIRST INTERMEDIATE DEVICE
FIRST SYSTEM COMMUNICATION UNIT
21
211
SECOND INTERMEDIATE DEVICE
SECOND SYSTEM COMMUNICATION UNIT
22
222
THIRD INTERMEDIATE DEVICE
FIRST SYSTEM COMMUNICATION UNIT
23
231
FOURTH INTERMEDIATE DEVICE
SECOND SYSTEM COMMUNICATION UNIT
24
242
FIFTH INTERMEDIATE DEVICE
FIRST SYSTEM COMMUNICATION UNIT
25
251
SIXTH INTERMEDIATE DEVICE
SECOND SYSTEM COMMUNICATION UNIT
26
262
FIRST LOWER DEVICE
FIRST SYSTEM COMMUNICATION UNIT
SECOND SYSTEM COMMUNICATION UNIT
31
311
312
SECOND LOWER DEVICE
FIRST SYSTEM COMMUNICATION UNIT
32
321
THIRD LOWER DEVICE
SECOND SYSTEM COMMUNICATION UNIT
33
332

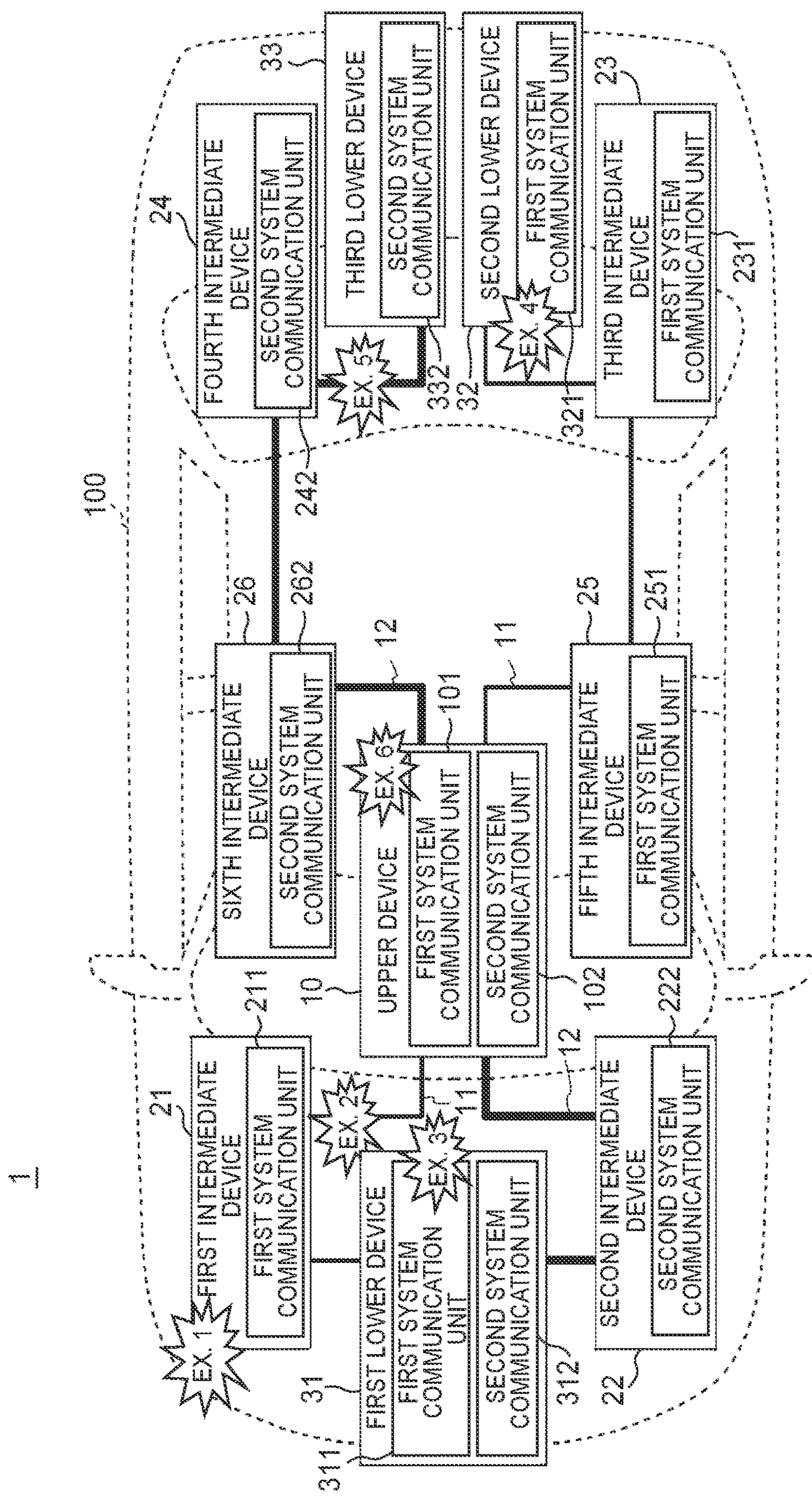
FIG. 2
1
100
FIRST INTERMEDIATE DEVICE
FIRST SYSTEM COMMUNICATION UNIT
21
211
EX. 1
EX. 2
EX. 3
FIRST LOWER DEVICE
FIRST SYSTEM COMMUNICATION UNIT
SECOND SYSTEM COMMUNICATION UNIT
31
311
312
SECOND INTERMEDIATE DEVICE
SECOND SYSTEM COMMUNICATION UNIT
22
222
UPPER DEVICE
FIRST SYSTEM COMMUNICATION UNIT
SECOND SYSTEM COMMUNICATION UNIT
10
101
102
11
12
EX. 6
SIXTH INTERMEDIATE DEVICE
SECOND SYSTEM COMMUNICATION UNIT
26
262
FIFTH INTERMEDIATE DEVICE
FIRST SYSTEM COMMUNICATION UNIT
25
251
FOURTH INTERMEDIATE DEVICE
SECOND SYSTEM COMMUNICATION UNIT
24
242
EX. 5
THIRD LOWER DEVICE
SECOND SYSTEM COMMUNICATION UNIT
33
332
SECOND LOWER DEVICE
FIRST SYSTEM COMMUNICATION UNIT
32
321
EX. 4
THIRD INTERMEDIATE DEVICE
FIRST SYSTEM COMMUNICATION UNIT
23
231

IN-VEHICLE NETWORK SYSTEM

INCORPORATION BY REFERENCE

The disclosure of Japanese Patent Application No. 2019-157921 filed on Aug. 30, 2019 including the specification, drawings and abstract is incorporated herein by reference in its entirety.

BACKGROUND

1. Technical Field

The disclosure relates to an in-vehicle network system.

2. Description of Related Art

A plurality of electronic devices called electronic control units (ECUs) and a plurality of electronic component devices are mounted on a vehicle. These devices share and execute various functions of the vehicle.

Japanese Unexamined Patent Application Publication No. 2014-78800 (JP 2014-78800 A) discloses a network system having a tree-type connection topology. That is, in the network system, one ECU serving as an upper node has a plurality of communication lines, and a plurality of ECUs serving as lower nodes are connected to each of the communication lines.

SUMMARY

In such a network system described in JP 2014-78800 A, it is conceivable to use a high-performance device that integrates functions for vehicle control as the upper node, and to use a simplified device controlled by the upper node as the lower nodes. It is also conceivable to further provide an intermediate node having a gateway function between the upper node and the lower nodes. However, in such a configuration, if a failure occurs in a communication line, an intermediate node, or the like, there is a possibility that the upper node cannot perform control and the functions cannot work properly. As described above, when functions are integrated into the upper node in a network system, there is room for consideration for improving robustness.

The disclosure provides a highly robust in-vehicle network system.

An in-vehicle network system according to a first aspect of the disclosure includes: an upper device; a first intermediate device that is connected to the upper device directly or via at least one device and is configured to communicate with the upper device using a first communication system; a second intermediate device that is connected to the upper device directly or via at least one device and is configured to communicate with the upper device using a second communication system; and a first lower device that is directly connected to the first intermediate device and is configured to communicate with the first intermediate device using the first communication system, and that is directly connected to the second intermediate device and is configured to communicate with the second intermediate device using the second communication system.

An in-vehicle network system according to a second aspect of the disclosure includes: an upper device, a third intermediate device that is connected to the upper device directly or via at least one device and is configured to communicate with the upper device using a first communication system; a fourth intermediate device that is connected to the upper device directly or via at least one device and is configured to communicate with the upper device using a second communication system, a second lower device that is directly connected to the third intermediate device and is configured to communicate with the third intermediate device using the first communication system; and a third lower device that is directly connected to the fourth intermediate device, is configured to communicate with the fourth intermediate device using the second communication system, and includes a function equivalent to a function of the second lower device.

According to the disclosure, a highly robust in-vehicle network system can be provided since the communication system and the configuration of the device are made redundant.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a configuration diagram of a network system according to an embodiment of the disclosure; and FIG. 2 is a diagram showing examples of failure occurrence locations of the network system according to the embodiment of the disclosure.

DETAILED DESCRIPTION OF EMBODIMENTS

According to an embodiment of the disclosure, communication is possible between an upper device and a lower device using two communication systems. Alternatively, two lower devices having the equivalent function can communicate with the upper device using different communication systems from each other. As a result, redundancy can be suitably provided to the network system, and robustness against a failure of each unit can be improved.

Embodiment

Hereinafter, the embodiment of the disclosure will be described in detail with reference to the drawings.

Configuration

FIG. 1 schematically shows a configuration of a network system 1 according to the embodiment and an arrangement thereof in a vehicle 100.

In the embodiment, the network system 1 includes an upper node, an intermediate node, and a lower node. The upper node is, for example, a relatively highly functional electrical control unit (ECU) that collectively executes calculations for various vehicle control functions. The lower node is, for example, a sensor or an actuator, or an ECU having a relatively specialized functions for individually controlling the sensor or the actuator. The intermediate node is, for example, an ECU that functions as a gateway that relays communication between the upper node and the lower node.

The network system 1 includes an upper device 10 as the upper node. In addition, at least one intermediate device, which is an intermediate node, is connected under the upper device 10 by a star type connection topology or a star and daisy chain type connection topology. That is, in the example shown in FIG. 1, a first intermediate device 21, a second intermediate device 22, a fifth intermediate device 25, and sixth intermediate device 26 are directly connected to the upper device 10 without intervening other devices (star type). Further, a third intermediate device 23 and a fourth intermediate device 24 are indirectly connected to the upper device 10 via the fifth intermediate device 25 and the sixth intermediate device 26 that are connected in a star-type connection topology (daisy chain type).

At least one lower device, which is a lower node, can be connected to each of the intermediate devices. FIG. 1 shows a first lower device 31, a second lower device 32, and a third lower device 33, and the other lower devices are not shown. The first lower device 31 is connected to the first intermediate device 21 and the second intermediate device 22. Further, the second lower device 32 is connected to the third intermediate device 23. Further, the third lower device 33 is connected to the fourth intermediate device 24.

In this example, the upper device 10 collects, via each intermediate device serving as a gateway, information on the vehicle 100 or information on surrounding conditions of the vehicle 100 from the lower device that controls sensors. This information may include, for example, operation conditions of actuators, etc., driving conditions of the vehicle 100 such as a speed and an acceleration of the vehicle 100, environmental conditions such as roads, objects, etc. surrounding the vehicle 100, seating status of occupants, and details of operations performed on various components of the vehicle 100. Note that some switches, sensors and the like, such as a start switch, may be directly connected to the upper device 10. The upper device 10 may acquire information from these switches, sensors and the like without intervening the intermediate device. The upper device 10 performs calculations based on the information to generate control data. The control data is data for controlling various functions of the vehicle 100, such as an autonomous driving function, a self-parking function, and drive assistance functions including collision avoidance, lane keeping, follow-up of the preceding vehicle, and maintaining speed, and operational control of an engine, a transmission, a cooling device, and air conditioner, charging and discharging control for a battery, lighting of headlamps in accordance with illuminance, permission of unlocking doors based on authentication using a mobile device (electronic key), and presentation of information to a user. The upper device 10 transmits the control data to the intermediate device, and causes the intermediate device to perform operation corresponding to the control data. The upper device 10 transmits, via the intermediate device serving as a gateway, the control data to the lower device that controls the actuator, and causes the lower device to perform operation corresponding to the control data. In the network system 1 described above, total cost is reduced by concentrating various control functions of the vehicle 100 in the highly functional upper device 10 and relatively simplifying the configurations of the intermediate device and the lower device instead.

Each of the above devices is typically configured to include a control unit, such as a processor or a microcomputer, and a memory. However, among the lower devices, there may be a lower device that includes sensors or actuators but does not include a control unit or a memory.

The upper device 10 is disposed, for example, in or near a center console of the vehicle 100. The intermediate devices are disposed separately from each other in various positions in the vehicle 100. The lower device is placed at a suitable position in accordance with its functions, and typically, is directly connected to the nearest intermediate device without intervening any other device therebetween.

The upper device 10 includes communication functions of two systems, namely, a first communication system and a second communication system. The upper device 10 includes a first system communication unit 101 that performs communication for the first communication system and a second system communication unit 102 that performs communication for the second communication system.

The first intermediate device 21, the third intermediate device 23, and the fifth intermediate device 25 each include first system communication unit 211, 231, and 251 that perform communication of the first communication system. In addition, the second intermediate device 22, the fourth intermediate device 24, and the sixth intermediate device 26 include second system communication units 222, 242, and 262 that perform communication of the second communication system, respectively.

The first lower device 31 includes a first system communication unit 311 that performs communication of the first communication system and a second system communication unit 312 that performs communication of the second communication system. The first lower device 31 is, for example, an electric power steering (EPS) system. The first lower device 31 is a device in which a communication system, a power supply system, and an actuator system are duplicated internally, and has a redundant configuration as a single unit. For example, the upper device 10 performs communication with the first lower device 31 using the first communication system such that one of the communication systems of the first lower device 31 can be controlled, and performs communication with the first lower device 31 using the second communication system such that the other of the communication systems of the first lower device 31 can be controlled. Therefore, even when a failure occurs in any one of the first communication system and the second communication system, the upper device 10 may control any one of the duplicated systems of the first lower device 31.

Further, the second lower device 32 includes a first system communication unit 321 that performs communication of the first communication system.

The third lower device 33 includes a second system communication unit 332 that performs communication of the second communication system.

The second lower device 32 and the third lower device 33 have functions equivalent to each other. These are, for example, a radar (radio-detection and ranging) sensor and a Lidar (laser-imaging detection and ranging) sensor used for a safety enhancement function such as collision avoidance of the vehicle 100. Note that the radar sensor and the Lidar sensor differ from each other in method of obtaining information. As described above, the second lower device 32 and the third lower device 33 have functions equivalent to each other. The lower devices detect an object around the vehicle 100 and measure the distance between the object and the vehicle 100. Here, the equivalent functions include not only completely identical functions but also similar and alternative functions. Unlike the first lower device 31, the second lower device 32 and the third lower device 33 do not have a redundant configuration themselves, but have a redundant configuration as a whole serving as a safety enhancement function as two devices having functions equivalent to each other. For example, if no failure has occurred in a first communication system and a second communication system via each intermediate device, the upper device 10 communicates with the second lower device 32 using the first communication system and the third lower device 33 using the second communication system. By using both functions of the second lower device 32 and the third lower device 33 in a mutually complementary manner, even if a failure occurs in one of the second lower device 32 and the third lower device 33, communication is performed via the other system and the functions of the other system are used. Thus, the safety enhancement function can be continuously executed. The second lower device 32 and the third lower device 33 may be two identical devices.

Communication of the first communication system and communication of the second communication system are performed via communication lines 11 and 12, respectively. In FIG. 1, the communication line 11 is indicated by a solid line, and the communication line 12 is indicated by a solid line thicker than that for the communication line 11. When the communication standard is a Controller Area Network (CAN) (registered trademark) standard, the first system communication unit and the second system communication unit described above are, for example, communication integrated circuits (IC). When the communication standard is an Ethernet (registered trademark) standard, the first system communication unit and the second system communication unit are, for example, Ethernet switches.

Processing

Hereinafter, examples of processing when a failure occurs in the network system 1 according to the embodiment will be described. FIG. 2 shows a failure occurrence location in each example.

Example 1 (EX. 1)

The example 1 is an example of the case in which a failure has occurred in the first system communication unit 211 of the first intermediate device 21. In this case, the upper device 10 cannot communicate with the first lower device 31 using the first communication system. The upper device 10 can continue to control the first lower device 31 because the upper device can communicate with the first lower device 31 via the second intermediate device 22 using the second communication system.

Example 2 (EX. 2)

The example 2 is an example of the case in which a failure has occurred in the communication line 11 between the first intermediate device 21 and the upper device 10 due to wire disconnection, etc. In this case, the upper device 10 cannot communicate with the first lower device 31 using the first communication system. The upper device 10 can continue to control the first lower device 31 because the upper device can communicate with the first lower device 31 via the second intermediate device 22 using the second communication system.

Example 3 (EX. 3)

The example 3 is an example of the case in which a failure has occurred in the first system communication unit 311 of the first lower device 31. In this case, the upper device 10 cannot communicate with the first lower device 31 using the first communication system. The upper device 10 can continue to control the first lower device 31 because the upper device can communicate with the first lower device 31 via the second intermediate device 22 using the second communication system.

Example 4 (EX. 4)

The example 4 is an example of the case in which a failure has occurred in the second lower device 32. In this case, the upper device 10 cannot cause the second lower device 32 to perform its function. The upper device 10 can continue control by communicating with the third lower device 33 that has the same function as the second lower device 32 and using the function of the third lower device 33.

Example 5 (EX. 5)

The example 5 is an example of the case in which a failure has occurred in the communication line 12 between the third lower device 33 and the fourth intermediate device 24 due to wire disconnection, etc. In this case, the upper device 10 cannot cause the third lower device 33 to perform its function. The upper device 10 can continue control by communicating with the second lower device 32 that has the function equivalent to that of the third lower device 33 and using the function of the second lower device 32.

Example 6 (EX. 6)

The example 6 is an example of the case in which a failure has occurred in the first system communication unit 101 of the upper device 10. In this case, the upper device 10 cannot communicate with the first lower device 31 and the second lower device 32 using the first communication system. The upper device 10 can continue to control the first lower device 31 because the upper device 10 can communicate with the first lower device 31 using the second communication system. Further, because the upper device 10 can communicate with the third lower device 33 that has the function equivalent to that of the second lower device 32 using the second communication system, the upper device 10 can continue control by communicating with the third lower device 33 and using the function of the third lower device 33.

Effects

According to the embodiment, communication is possible between the upper device and the lower device using two communication systems. Alternatively, two lower devices having the equivalent function can communicate with the upper device using different communication systems from each other. Thus, redundancy can be suitably provided to the network system 1, and robustness against a failure of each unit can be improved. In particular, in the embodiment, the intermediate device does not need to internally have redundant communication systems, etc. Therefore, the cost can be reduced. In the embodiment above, two communication systems are provided. However, other communication paths may be added to further increase the redundancy.

When the vehicle 100 is divided into four sections of a right front section, a left front section, a right rear section, and a left rear section about the position at which the upper device 10 is disposed as a center, at least one intermediate device that performs communication using the first communication system is disposed in each of the right front section and the left rear section that is diagonal to the right front section, and at least one intermediate device that performs communication using the second communication system is disposed in each of the left front section and the right rear section that is diagonal to the left front section. For example, the upper device 10 and the intermediate devices may be disposed as shown in FIG. 1. The first communication system and the second communication system may be reversed. With this configuration, a set of the intermediate devices that perform communication using different communication systems from each other are provided in two sections that are adjacent to each other in a front-rear direction of the vehicle 100, and another set of the intermediate devices are provided in two sections that are adjacent to each other in a right-left direction of the vehicle 100. Accordingly, in the vehicle 100, as the positions for arranging the lower devices, more positions in the front-rear direction and in the right-left direction of the vehicle 100 at which the upper device 10 is easily connected to both of the intermediate device that performs communication using the first communication system and the intermediate device that performs communication using the second communication system and at which the redundancy is easily achieved can be secured.

The disclosure is not limited to the network system, and can be implemented as an in-vehicle device such as a device included in the network system, a control method executed by an in-vehicle device having a processor and a memory, a control program, a computer-readable non-transitory storage medium that stores the control program, and a vehicle equipped with the network system, etc. The disclosure can be applied to network systems other than the network system mounted on the vehicle.

The disclosure is advantageous for a network system mounted on a vehicle or the like.

What is claimed is:

1. An in-vehicle network system comprising:

an upper device;

a first intermediate device that is connected to the upper device directly or indirectly and is configured to communicate with the upper device using a first communication system;

a second intermediate device that is connected to the upper device directly or indirectly and is configured to communicate with the upper device using a second communication system; and a first lower device (i) that is directly connected to the first intermediate device and is configured to communicate with the first intermediate device using the first communication system, and (ii) that is directly connected to the second intermediate device and is configured to communicate with the second intermediate device using the second communication system, wherein:

the in-vehicle network system includes a plurality of the first intermediate devices and a plurality of the second intermediate devices, one of the first intermediate devices is disposed in one of four sections of a vehicle, the four sections being a right front section, a left front section, a right rear section, and a left rear section that are divided about a position in the vehicle at which the upper device is disposed;

another one of the first intermediate devices is disposed in a second one of the four sections that is diagonal to the one of the four sections;

each of the first intermediate devices disposed in the one of the four sections and in second one of the four sections is connected to the upper device directly or indirectly and is configured to communicate with the upper device using the first communication system;

one of the second intermediate devices is disposed in a third one of the four sections that is adjacent to the one of the four sections in a front-rear direction of the vehicle;

another one of the second intermediate devices is disposed in a fourth one of the four sections that is adjacent to the one of the four sections in a right-left direction of the vehicle; and each of the second intermediate devices disposed in the third and fourth sections is connected to the upper device directly or indirectly, and is configured to communicate with the upper device using the second communication system.

2. The in-vehicle network system according to claim 1, wherein the upper device is configured to:

generate control data to control a vehicle; and transmit the control data to the first lower device via at least one of the first intermediate device or the second intermediate device.

3. The in-vehicle network system according to claim 2, wherein the first lower device includes an actuator configured to control a movement of the vehicle.

4. An in-vehicle network system comprising:

an upper device;

a first intermediate device that is connected to the upper device directly or indirectly and is configured to communicate with the upper device using a first communication system;

a second intermediate device that is connected to the upper device directly or indirectly and is configured to communicate with the upper device using a second communication system;

a first lower device that is directly connected to the first intermediate device and is configured to communicate with the first intermediate device using the first communication system; and a second lower device that is directly connected to the second intermediate device, is configured to communicate with the second intermediate device using the second communication system, and performs a function equivalent to a function performed by the first lower device, wherein:

the in-vehicle network system includes a plurality of the first intermediate devices and a plurality of the second intermediate devices, one of the first intermediate devices is disposed in one of four sections of a vehicle, the four sections being a right front section, a left front section, a right rear section, and a left rear section that are divided about a position in the vehicle at which the upper device is disposed;

another one of the first intermediate devices is disposed in a second one of the four sections that is diagonal to the one of the four sections;

each of the first intermediate devices disposed in the one of the four sections and in the second one of the four sections is connected to the upper device directly or indirectly and is configured to communicate with the upper device using the first communication system;

one of the second intermediate devices is disposed in a third one of the four sections that is adjacent to the one of the four sections in a front-rear direction of the vehicle;

another one of the second intermediate devices is disposed in a fourth one of the four sections that is adjacent to the one of the four sections in a right-left direction of the vehicle; and each of the second intermediate devices disposed in the third and fourth sections is connected to the upper device directly or indirectly, and is configured to communicate with the upper device using the second communication system.

5. The in-vehicle network system according to claim 4, wherein the upper device is configured to:

obtain at least one of information on a vehicle or information on a surrounding condition of the vehicle from at least one of the first lower device or the second lower device; and generate control data to control the vehicle based on the at least one of the information on the vehicle or the information on the surrounding condition of the vehicle.

6. The in-vehicle network system according to claim 5, wherein:

the first lower device includes a first sensor that is configured to obtain at least one of the information on the vehicle or the information on the surrounding condition of the vehicle; and the second lower device includes a second sensor configured to obtain, by using a method different from a method used by the first sensor, information that is the same as the information obtained by the first sensor.

7. An in-vehicle network system comprising:

an upper device;

a first intermediate device that is connected to the upper device directly or indirectly and is configured to communicate with the upper device using a first communication system;

a second intermediate device that is connected to the upper device directly or indirectly and is configured to communicate with the upper device using a second communication system;

a first lower device (i) that is directly connected to the first intermediate device and is configured to communicate with the first intermediate device using the first communication system, and (ii) that is directly connected to the second intermediate device and is configured to communicate with the second intermediate device using the second communication system;

a third intermediate device that is connected to the upper device directly or indirectly and is configured to communicate with the upper device using the first communication system;

a fourth intermediate device that is connected to the upper device directly or indirectly and is configured to communicate with the upper device using the second communication system;

a second lower device that is directly connected to the third intermediate device and is configured to communicate with the third intermediate device using the first communication system; and a third lower device that is directly connected to the fourth intermediate device, is configured to communicate with the fourth intermediate device using the second communication system, and performs a function equivalent to a function performed by the second lower device, wherein:

each of the first intermediate device and the third intermediate device is a first device;

each of the second intermediate device and the fourth intermediate device is a second device;

one of the first devices is disposed in one of four sections of a vehicle, the four sections being a right front section, a left front section, a right rear section, and a left rear section that are divided about a position in the vehicle at which the upper device is disposed;

another one of the first devices is disposed in a second one of the four sections that is diagonal to the one of the four sections;

each of the first devices disposed in the one of the four sections and in the second one of the four sections is connected to the upper device directly or indirectly and is configured to communicate with the upper device using the first communication system;

one of the second devices is disposed in a third one of the four sections that is adjacent to the one of the four sections in a front-rear direction of the vehicle; and another one of the second devices is disposed in a fourth one of the four sections that is adjacent to the one of the four sections in a right-left direction of the vehicle; and each of the second devices disposed in the third and fourth sections is connected to the upper device directly or indirectly, and is configured to communicate with the upper device using the second communication system.

8. The in-vehicle network system according to claim 7, wherein the upper device is configured to:

generate control data to control a vehicle; and transmit the control data to the first lower device via at least one of the first intermediate device or the second intermediate device.

9. The in-vehicle network system according to claim 8, wherein the first lower device includes an actuator configured to control a movement of the vehicle.

* * * * *